Aug. 29, 1967  J. W. SCONCE  3,338,237
PNEUMATIC SPLINT
Filed Oct. 20, 1964
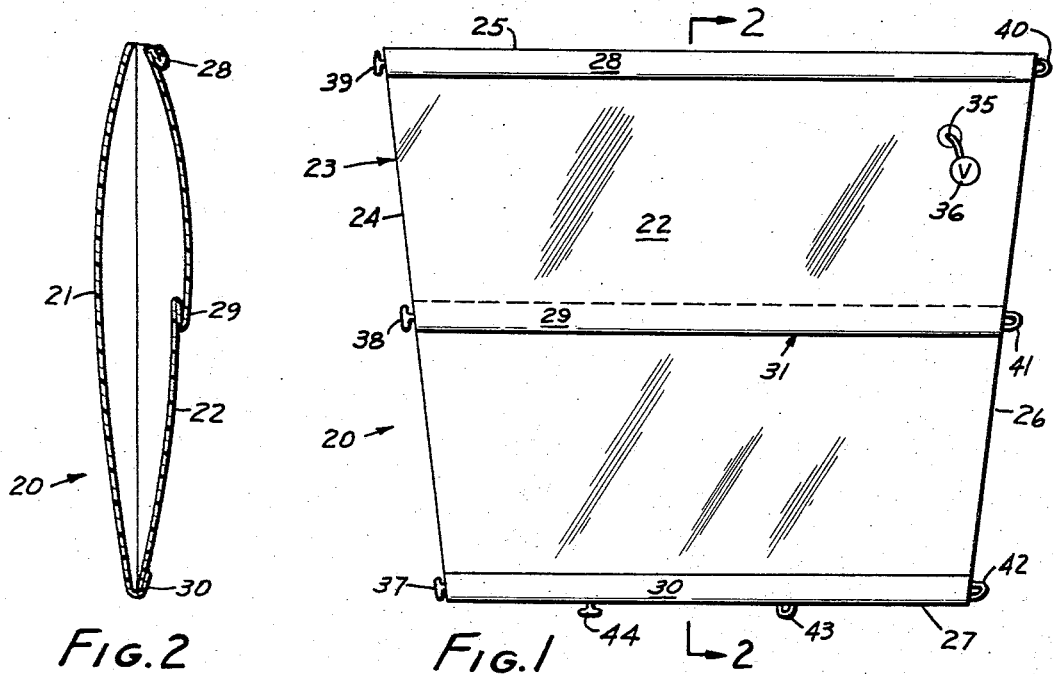
FIG. 2  FIG. 1
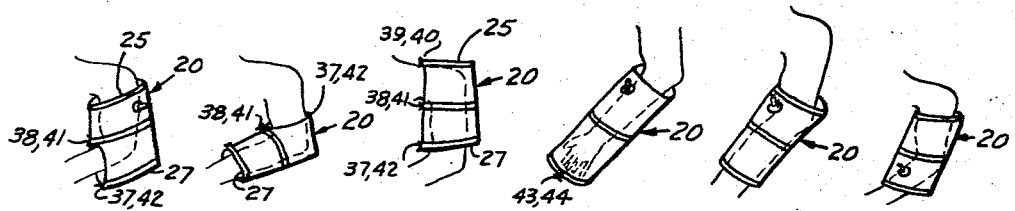
FIG. 3  FIG. 4  FIG. 5  FIG. 6  FIG. 7  FIG. 8
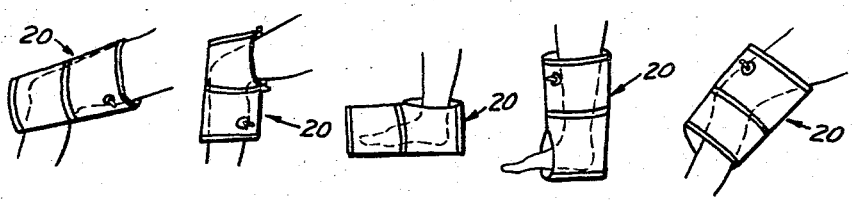
FIG. 9  FIG. 10  FIG. 11  FIG. 12  FIG. 13
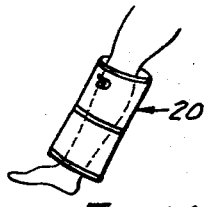 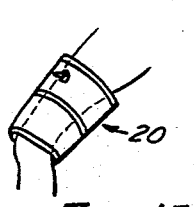
FIG. 14  FIG. 15
INVENTOR.
JERRY W. SCONCE
BY
ATTORNEYS.

3,338,237
PNEUMATIC SPLINT
Jerry Wayne Sconce, 842 E. Cypress,
Glendora, Calif. 91740
Filed Oct. 20, 1964, Ser. No. 405,138
6 Claims. (Cl. 128—87)

This invention relates to a pneumatic splint.

The conventional splint is well known. It customarily includes a rigid brace to which an arm or other member is strapped. Should the member be seriously damaged, it is frequently necessary to place it in a plaster cast which exerts a greater degree of support in a spatial configuration, but which is of course quite uncomfortable, and cannot be removed even for short periods of time. Furthermore, the use of splints, especially of temporary splints for first-aid purposes, frequently interferes with the most convenient means for controlling loss of blood. If a splint or other restraint has to be put on the member, often the blood flow has to be stopped at an inconvenient location upstream, instead of at a more convenient location closer to the injury.

It is an object of this invention to provide a pneumatic split which can also operate as a tourniquet, if desired, and which splint is of nearly universal application throughout the body such as at the shoulders, elbows, knees, neck, and ankles. The universal applicability of this device represents a considerable improvement over previously known splints and tourniquets.

A pneumatic splint according to this invention comprises an inflatable envelope which includes a flexible, impermeable continuous wall having opposite surfaces and a continuous periphery. This periphery includes three edges with fastener means on them, which fastener means are so disposed and arranged as to enable at least portions of at least two of said edges to be joined when the envelope is folded about a body member. The envelope may then be inflated, thus to become rigid and support the injured member in the desired position, or to staunch the flow of blood by the pressure which it exerts.

According to a preferred but optional feature of this invention, the fastener means are spaced apart so as to leave gaps when they are fastened, enabling the body member to pass through the gaps, thereby accommodating members in various angularities.

According to still another preferred but optional feature of this invention, at least one of the said surfaces is relatively stiffened at two opposite edges, and also along a strip which is disposed between, spaced from, and generally parallel to the stiffened edges. In this way, relatively greater resistance to bending of the envelope is provided in planes which are transverse to the stiffened portions than in planes parallel to them. This aids in supporting the folded structure, and reduces its tendency to balloon.

The above and other features of this invention will be fully understood from the following detailed description and the accompanying drawings in which:

FIG. 1 is a plan view of the presently preferred embodiment of the invention;

FIG. 2 is a fragmentary cross-section taken at line 2—2 of FIG. 1; and

FIGS. 3–15 are side views showing the device in various useful positions.

FIG. 1 illustrates the presently preferred embodiment of the invention which comprises an inflatable envelope 20 comprised of two sheets 21, 22 of flexible, impermeable and continuous material such as polyethylene sheeting. The preferred embodiment of the invention is generally trapezoidal and includes a periphery 23 having four edges 24, 25, 26, 27. The periphery is formed by heat or adhesive sealing, and is fluid-tight. One or both of the sheets will include stiffened portions, for example, sheet 22. Sheet 21 may or may not include like stiffened portions.

A simple technique for making the stiffened portions is either to apply an additional strip of the same kind of material to the sheet or, as shown, to create and fuse S-shaped folds 28, 29, 30 at edges 25 and 27 and along a strip 31 which is spaced from and located between and parallel to edges 25 and 27. The effect of these stiffened portions is to render the device less easily foldable in planes which are transverse to edges 25 and 27 and to strip 31, than in planes parallel to them. Furthermore, they lessen the tendency of the envelope to balloon.

A port 35 is formed through one of the sheets, such as sheet 22, and includes valve means 36 for enabling fluid under pressure to be injected into the inside of the envelope. Then the valve means is closed so as to retain the desired state of inflation. The greater the internal pressure, the stiffer the structure becomes.

Fastener means 37–44, inclusive, are formed along three of the edges. Fastener means 37–39 are spaced apart from each other along edge 24. Fastener means 40, 41, 42 are spaced apart from each other along edge 26, and fastener means 43 and 44 are spaced apart from each other along edge 27. Fastener means 37, 39, 40 and 42 are located at the corners of the structure where respective strips end, while fastener means 38 and 41 are located along their respective edges at the ends of stiffened strip 31.

Fastener means 37–39 are complementary to fastener means 40–42 and adapted to engage each other. Fastener means 43 and 44 are similarly complementary, and adapted to be engaged to each other in order that certain operative configurations can be attained.

From the foregoing, it will be seen that the construction is that of an inflatable, flexible envelope which will become stiffened by inflation, the degree of stiffening being proportional to the degree of inflation. It folds rather readily in planes transverse to the folds, and is adapted to be held in various folded configurations by the fastener means. Specific examples of the configurations are shown in FIGS. 3–15.

As can be seen in FIG. 3, the device, when folded, has a longer vertical dimension than horizontal dimension. This enables a bent elbow and the upper arm to be enclosed by the folded structure with engagement between fastener means 37–39 and 40–42. The upper arm passes through the gap formed by the fold of edge 25, and the lower arm passes out through the gap between assembled fastener means 38 and 41, and 37 and 42, respectively.

The general construction of FIG. 3 is shown in another arrangement in FIG. 4 wherein advantage is taken of the greater dimension in order to give support to the bent elbow and the lower arm instead of the upper arm. In this case, the upper arm goes through the gap between fastener means 38 and 41 and 37 and 42, and the lower arm goes through the opening formed by the fold of edge 27. One purpose of the tapered trapezoidal construction is to accommodate tapering portions of the human body in the various positions.

FIG. 5 illustrates the device applied to the upper arm and shoulder. In this case, the fastener means 38, 41 and 37, 42 are fastened under the armpit in order that a portion of the shoulder and the upper arm may pass through the gaps between the fastener means.

FIG. 6 illustrates the device formed into a tube with the lower arm completely encased. In this arrangement, fastener means 43 and 44 will be fastened to close the lower edge. It will be noted in the examples of FIGS. 3 and 4, and also in the remaining examples, that whenever the body members are to project from locations other than the end formed by edge 27, then fastener means 43 and 44 will be joined.

FIG. 7 illustrates the application to a straight elbow and lower arm, and FIG. 8 to a straight elbow and upper arm.

The device is applicable to the knee and leg in the same manner as to the arm, and these usages are illustrated in FIGS. 9 and 10. Similarly, the pivoted junction of the ankle and either the foot or the lower leg can be accommodated as shown in FIGS. 11 and 12, respectively.

The knee, when straight, can be accommodated as shown in FIG. 13, and the lower leg and upper leg as in FIGS. 14 and 15, respectively.

This device is also applicable to encasing larger areas by duplication of structure, such as by encasing the upper torso. This can be done by joining fastener means 37–38 to complementary fastener means 40–42 of another similar device with the devices placed at opposite sides of the torso. This enables larger portions of the body to be accommodated by multiplication of the device.

The specific forms of the fastener means which have been shown are simple button or hook and loop devices. It will however be understood that various latch-type or catch-type devices, or other fastener means could be provided which need merely be complementary in nature so as to be joinable.

This invention is not to be limited by the embodiment shown in the drawings and described in the description, which is given by way of example and not of limitation, but only in accordance with the scope of the appended claims.

I claim:
1. A pneumatic splint for rendering a human arm and the like substantially immobile, the splint comprising a flexible, inflatable envelope fabricated of fluid-impervious sheet means, the envelope having four peripheral edges including two opposite edges and a third edge extending transversely of the envelope between said opposite edges, the peripheral edges of the envelope being arranged to impart a trapezoidal planform configuration to the envelope, said opposite edges defining the non-parallel edges of the trapezoid, a plurality of independently operable first fastener means secured to the envelope at spaced locations along one of the two opposite edges, a corresponding plurality of independently operable second fastener means secured to the envelope at corresponding spaced locations along the other of the two opposite edges, the first and second fastener means being arranged for cooperation with each other for maintaining said opposite edges in substantial registration with each other when the envelope is arranged to encompass a selected portion of a human arm and the like, a plurality of stiffening ribs defined by said sheet means extending in spaced relation to each other between said two opposite edges along the parallel edges of the trapezoid and intermediate said parallel edges, a port to the interior of the envelope for admitting envelope-inflating fluid into the envelope for inflating the envelope sufficiently to render substantially immobile an arm and the like encompassed by the envelope, and valve means associated with the port for retaining inflating fluid within the envelope.

2. A splint according to claim 1 wherein said fastener means are secured to the envelope at opposite ends of the ribs.

3. A pneumatic splint for rendering a human arm and the like substantially immobile, the splint comprising a flexible, inflatable envelope fabricated of fluid-impervious sheet material, the envelope having two opposite major surfaces defined by corresponding portions of the sheet material and four peripheral edges including two opposite edges and substantially parallel third and fourth edges extending transversely of the envelope between said two opposite edges, said corresponding portions of the sheet material being connected together essentially only along the peripheral edges of the envelope to define a single inflation chamber within the envelope, a plurality of independently operable first fastener means secured to the envelope at spaced locations along one of the two opposite edges, a corresponding plurality of independently operable second fastener means secured to the envelope at corresponding spaced locations along the other of the two opposite edges, the first and second fastener means being arranged for cooperation with each other for maintaining said opposite edges in substantial registration with each other when the envelope is arranged to encompass a selected portion of a human arm and the like, a plurality of stiffening ribs defined by said sheet material extending in spaced relation to each other transversely of the envelope across one of the major surfaces thereof from one of the two opposite edges to the other of the opposite edges substantially parallel to the third and fourth edges, the plurality of stiffening ribs for the envelope including at least one rib disposed between the third and fourth edges of the envelope, the at least one rib being defined solely by the portion of the sheet material defining said one major surface independent of the sheet portion defining the other major surface, a port through the envelope to the inflation chamber for inflating the envelope, and sealing means for the port for retaining envelope-inflating fluid within the chamber.

4. A splint according to claim 3 including additional ones of said first and second fastener means secured to the envelope at spaced locations along the third edge of the envelope and arranged for cooperation with each other when said opposite edges are substantially registered with each other.

5. A splint according to claim 3 wherein the first fastener means define hooks and the second fastener means define eyes for receiving the hooks.

6. A splint according to claim 3 wherein the fastener means are arranged to provide gaps along said opposite registered edges between the engaged fastener means to enable the arm and the like to pass therethrough.

References Cited

UNITED STATES PATENTS

| | | | |
|---|---|---|---|
| 2,029,912 | 2/1936 | Cossor | 128—327 |
| 2,651,302 | 9/1953 | Berry | 128—87 |
| 2,823,668 | 2/1958 | Van Court et al. | 128—87 |
| 3,074,398 | 1/1963 | Guiney | 128—87 |
| 3,164,152 | 1/1965 | Vere Nicoll | 128—87 |
| 3,193,984 | 7/1965 | Schubert. | |

RICHARD A. GAUDET, *Primary Examiner.*

J. W. HINEY, *Assistant Examiner.*